United States Patent
Han et al.

(10) Patent No.: US 9,615,297 B2
(45) Date of Patent: *Apr. 4, 2017

(54) METHOD FOR IDENTIFYING USER EQUIPMENT TO A FEMTOCELL

(71) Applicant: Google Technology Holdings LLC, Mountain View, CA (US)

(72) Inventors: Guang Han, Arlington Heights, IL (US); John M. Harris, Glenview, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/632,659

(22) Filed: Feb. 26, 2015

(65) Prior Publication Data

US 2015/0172980 A1   Jun. 18, 2015

Related U.S. Application Data

(63) Continuation of application No. 12/651,708, filed on Jan. 4, 2010, now Pat. No. 8,996,016.

(Continued)

(51) Int. Cl.
*H04W 36/04* (2009.01)
*H04W 36/00* (2009.01)
*H04W 84/04* (2009.01)

(52) U.S. Cl.
CPC ....... *H04W 36/04* (2013.01); *H04W 36/0072* (2013.01); *H04W 84/045* (2013.01)

(58) Field of Classification Search
None
See application file for complete search history.

(56) References Cited

U.S. PATENT DOCUMENTS 6,381,457 B1   4/2002   Carlsson et al.
6,775,255 B1   8/2004   Roy
(Continued)

FOREIGN PATENT DOCUMENTS

| EP | 2150072 A1 | 2/2010 |
|---|---|---|
| WO | 2008131588 A1 | 11/2008 |
| WO | 2008131591 A1 | 11/2008 |

OTHER PUBLICATIONS

3GPP TSG RAN 2#59bis, R2-073919, Shanghai, China, Oct. 8-12, 2007, "Discovery of and mobility of DSG cells", T-Mobile, Ericsson, Huawei, all pages.

(Continued)

*Primary Examiner* — Hicham Foud
(74) *Attorney, Agent, or Firm* — Lerner, David, Littenberg, Krumholz & Mentlik, LLP

(57) ABSTRACT

The described method provides for an efficient method for user equipment (104) to identify when it is in proximity to an assigned femtocell (108) in order to be handed over to a femtocell from a macro cell. As the user the equipment moves within a macro cell (106) that is defined by a serving base station (102), it is determined (202) that it is in the range of or in proximity to the femtocell to which it is registered or subscribed. Upon notification that it is near the femtocell, the user equipment sends (204) a message to the serving base station of the macro cell indicating the user equipment has identified its femtocell. The serving base station then sends (208) a message to femtocell to turn on the femtocell so that a handover of the user equipment from the macro cell and serving base station and the femtocell can be initiated. The serving base station sends (212) a response to the user equipment indicating that the femtocell is ready to receive the user equipment as a part of handover procedure.

19 Claims, 3 Drawing Sheets

Related U.S. Application Data

(60) Provisional application No. 61/142,513, filed on Jan. 5, 2009.

(56) References Cited

U.S. PATENT DOCUMENTS

| | | | |
|---|---|---|---|
| 8,335,503 | B1 | 12/2012 | Desmond et al. |
| 2005/0198363 | A1* | 9/2005 | Ling .................. H04W 36/0011 709/236 |
| 2007/0254620 | A1* | 11/2007 | Lindqvist .............. H04W 48/12 455/403 |
| 2008/0005596 | A1 | 1/2008 | Sistla et al. |
| 2008/0318576 | A1 | 12/2008 | So et al. |
| 2008/0318596 | A1 | 12/2008 | Tenny |
| 2009/0005031 | A1 | 1/2009 | Van Lieshout et al. |
| 2009/0129341 | A1 | 5/2009 | Balasubramanian et al. |
| 2009/0257353 | A1 | 10/2009 | Song et al. |
| 2009/0280819 | A1* | 11/2009 | Brisebois ............ H04W 52/244 455/446 |
| 2010/0048212 | A1* | 2/2010 | Yavuz ................. H04W 52/244 455/436 |
| 2010/0167728 | A1* | 7/2010 | Venkitaraman ....... H04W 36/04 455/434 |
| 2010/0227627 | A1* | 9/2010 | Ishii ........................ H04W 8/06 455/456.2 |
| 2011/0116476 | A1* | 5/2011 | Lee ..................... H04W 52/241 370/331 |

OTHER PUBLICATIONS

3GPP TAG RAN WG3 Meeting #61, R3081949, Jeju Island, Korea, Aug. 18-22, 2008, "Dynamic Setup of HNBs for Energy Savings and Interference Reduction", Mitsubishi Electric, all pages.

Biyee, Nicole: "The International Search Report and the Written Opinion of the International Searching Authority", European Patent Office, Rijswijk, completed: Mar. 12, 2010, mailed: Mar. 22, 2010, all pages.

Huawei: "Cell re-selection for home eNB/NodeB", 3GPP TSG RAN2, vol. R2-072491, No. 58, Jun. 25, 2007, pp. 1-4.

* cited by examiner

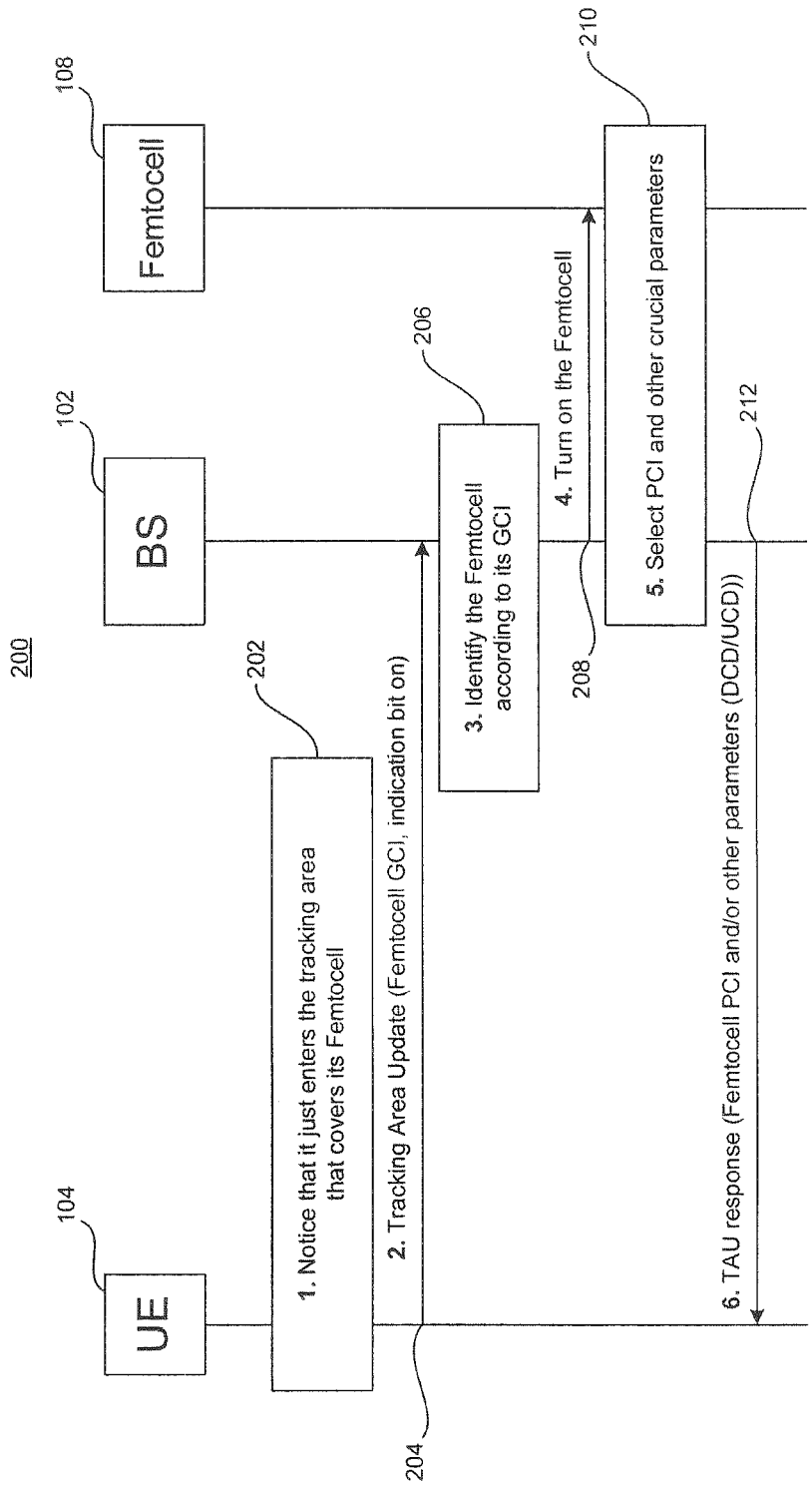

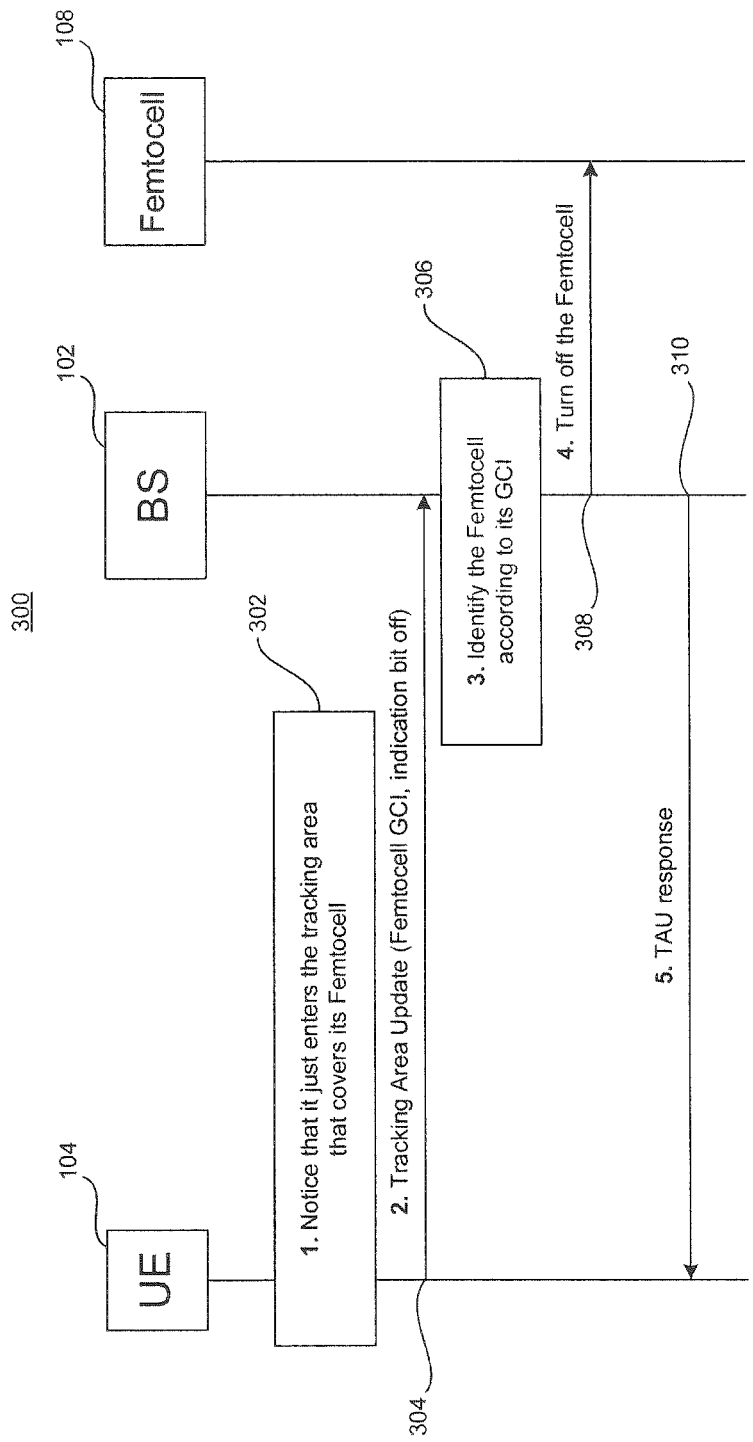

METHOD FOR IDENTIFYING USER EQUIPMENT TO A FEMTOCELL

CROSS-REFERENCE TO RELATED APPLICATIONS

The present application is a continuation of U.S. patent application Ser. No. 12/651,708, filed Jan. 4, 2010, which claims the benefit of U.S. Provisional Application No. 61/142,513, filed Jan. 5, 2009, the disclosure of which is incorporated herein by reference.

FIELD OF THE INVENTION

The present invention relates generally to identifying user equipment to a femtocell, and in particular for the user equipment to identify a femtocell when in the femtocell's proximity and to search for and connect to that femtocell.

BACKGROUND

Femtocells are small telecommunication cells that are controlled by an access point. Femtocells are typically used in residential or other small locations. Femtocells connect into telecommunication networks using broadband or other similar types of connections. Femtocells are commonly used in association $3^{rd}$ and $4^{th}$ Generation telecommunication systems such as UMTS and LTE systems.

A large number of femtocells can be configured within a macro cell serviced by one or more serving base stations within a telecommunication system thereby creating a high density of femtocells in a given area. As user equipment moves within the macro cell, the user equipment will attempt to connect to the plurality of femtocells that are in the area of the user equipment. As user equipment connects only to femtocells to which it is authorized, the multiple attempts can cause interference and an excess of control messages.

Based on this, there is a need to reduce the number of futile attempts that are made for user equipment to connect to inaccessible femtocells. Since a macro cell may have a large number of femtocells within its operating area, it is difficult to include all the femtocells into its neighbor list. Moreover, a tracking area within a macro cell may include a large number of femtocells, and it is not desirable to send paging packets to user equipment through a femtocell that the user equipment cannot access.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a call flow diagram of user equipment detecting and connecting to a femtocell in accordance with embodiments of the present invention.

FIG. 3 is a call flow diagram of user equipment leaving a femtocell in accordance with embodiments of the present invention.

Figure 1:
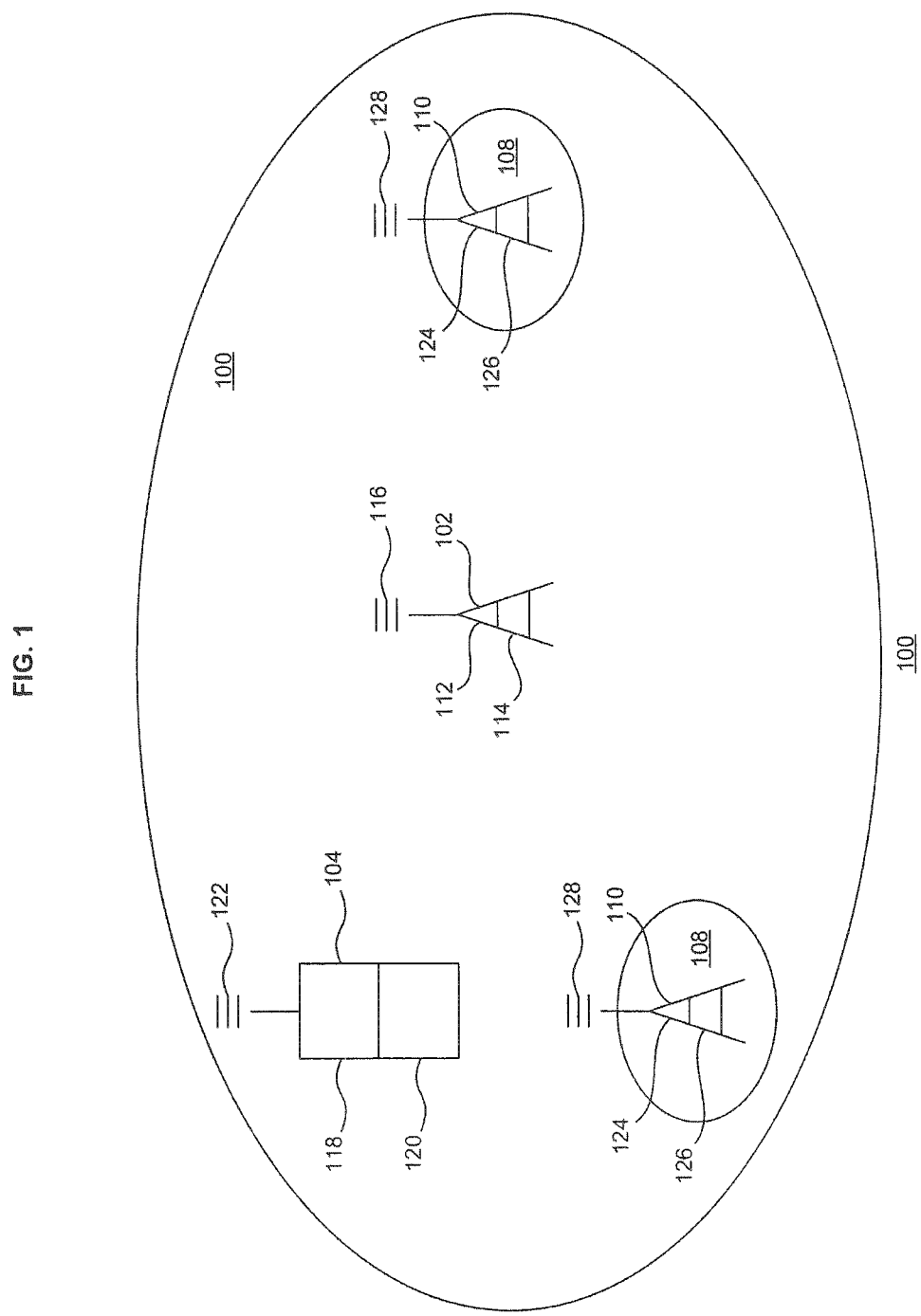
FIG. 1 is block diagram of a wireless communication system in which embodiments of the invention are used.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method of identifying user equipment in a femtocell. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method of identifying user equipment in a femtocell described herein. The non-processor circuits may include, but are not limited to, a radio receiver, a radio transmitter, signal drivers, clock circuits, power source circuits, and user input devices. As such, these functions may be interpreted as steps of a method to perform identifying user equipment in a femtocell. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The described method provides for an efficient method for user equipment to scan for and to be handed over to a femtocell from a macro cell. The method includes user equipment that is registered with or subscribed to a given femtocell. As the user equipment moves within a macro cell that overlays the femtocell to which it is registered or subscribed, it is determined that it is in the range of or in proximity to the femtocell. Upon determining that it is near the femtocell, the user equipment sends a message including the femtocell identification information to the serving base station of the macro cell indicating the user equipment is in proximity to its femtocell. According to the femtocell identification provided in the message, the serving base station then sends a message to that femtocell to turn on the femtocell (or increase the femtocell transmission power) so that a handover of the user equipment from the macro cell and serving base station to the femtocell can be initiated. A response message is sent from the femtocell to the serving base station of the macro cell, and the serving base station sends a response to the user equipment indicating that the femtocell is ready to receive the user equipment as a part of handover procedure. In an embodiment, the response message includes femtocell identification and access information to help the user equipment to connect to the femtocell.

The described method includes a user equipment determining that the user equipment is within range of a home cell, which can be femtocell by recognizing that it is in or proximate to the macro cell in which the femtocell is located. The home cell is one of a plurality of such cells that are within an area served by a serving base station. Upon determining that the user equipment is within range of the home sell, a method includes the user equipment sending a first message to the serving base station corresponding to the which the home cell. The first message includes at least one of the global identifier of the home cell, an identifier associated with the serving base station and the user equipment. After sending the first message, the user equipment receives a second message indicating that the home cell is activated to receive the user equipment as a part of handover. The second message includes at least the physical identifier and can include a preamble or scrambling code of the home cell and the identifier associated with the serving base station.

In an embodiment of the described method, the step of determining that the user equipment is near or is proximate to the home cell includes detecting an identifier of the home cell where the home cell identifier is stored by the user equipment. Moreover, the first message can be a tracking area update message that is sent from the user equipment to the macro base station or some core network element. In another embodiment, a message is sent from the serving base station of the macro cell to the home cell to activate the home cell to receive the user equipment as a part of the handover procedure.

The described method also includes a serving base station receiving a first message indicating that a user equipment operating within the macro cell of the serving base station is within range of a home cell wherein the home cell is one of a plurality of cells in an area served by a serving base station. The first message can include at least an identifier of the home cell, the user equipment and the global ID of the macro cell. In response to the first message, the serving base station sends a second message to the home cell to activate the home cell so that the user equipment can connect to the home cell through a handover (or cell reselection) procedure. In addition, the base station sends a third message to the user equipment wherein the third message includes parameters of the home cell so that the user equipment can scan and conduct the handover procedure with the home cell.

In an embodiment, each of the first, second and third messages can include at least one of an identifier of the home cell, an identifier of the serving base station and an identifier of the user equipment. Moreover, the second message may include control information to increase the transmission power of the home cell instead of activating the home cell. In addition, the third message includes a physical cell identification or preamble for the home cell.

Turning to FIG. 1, there is shown a wireless telecommunication system 100. System 100 includes a serving base station 102 that provides wireless communications to user equipment 104 that operate within the macro cell 106 defined by the serving base station 102. The wireless communications between the serving base station 102 and the user equipment operates according to known and developing standards including UMTS, LTE and Wimax/802.16 standard protocols. As is seen, the macro cell includes a plurality of home cells or femtocells 108 that are configured within the macro cells. Each of the plurality of femtocells is served by an access point known as a home Node B 110 or Home eNode B 110.

As is understood, the serving base station 102 includes a processor 112, memory 114 and antenna 116. Likewise, the user equipment 104 also includes a processor 118, memory 120 and antenna 122. In addition, the home Node B 110 includes a processor 124, memory 126 and antenna 128. The serving base station 102, user equipment 104 and home Node B 110 transmit in and receive messages with one another using the processors 112, 118 and 124, memories 114, 120 and 126 and antennae 116, 122 and 128, respectively, according to standard protocol methods and according to the methods and procedures described here.

FIG. 2 is a call flow diagram 200 demonstrating the messaging between the serving base station 102, the user equipment 104 and the home Node B 110 of the home cell or femtocell 108. The user equipment 104 can activate the femtocell 108 or prepare the femtocell 108 for a possible handover or cell reselection of the user equipment 104 by sending a message to the serving base station 102 of the macro cell 106 when it enters the area or proximity of the femtocell or is in the macro cell. A message from the serving base station will assist the user equipment to scan for the femtocell in which it can operate or can be handed over or reselected for that femtocell according to standard practices in handover and reselection.

The user equipment 104 determines 202 that it enters into the tracking area of the femtocell in which it is registered. In order to determine that it is in the femtocell's tracking area, the user equipment 104 has stored the tracking area identifier for the femtocell. Alternatively or in addition, the user equipment has stored the global cell identifier of the overlay macro cell and the serving base station 102 as well as the global cell identifier of the femtocell. The user equipment 104 determines that it is near or in proximity to its corresponding femtocell when it detects the tracking area identification or the overlay macro base station identifier that is broadcasted by the serving macro base station. The user equipment will compare the broadcasted tracking area identification or overlay macro base station ID with the stored tracking area identification or overlay macro base station ID to determine if it is near its femtocell.

When a match between broadcasted tracking area identification and the stored tracking area identification is found, the user equipment 104 sends 204 a tracking area update message to the serving base station 102 for the macro cell, which may further forward the message to some core network elements (not shown). The tracking area update message includes the identification information for the femtocell 108 including the femtocell's tracking area identification or the global cell identifier. In addition, the tracking area update message can include an on bit to indicate that the femtocell is to be initiated. In an embodiment, the message from the user equipment 104 to the serving base station 102 can be a message other than a tracking area update message where the message would indicate that the appropriate femtocell has been located. If the base station 102 is operating according to LTE, the message includes the Global Cell ID or Global eNodeB ID of the femtocell 108 which is stored in the user equipment.

The message may also include the Global Cell ID, Global eNodeB ID and the tracking area ID of the home eNode B gateway (not shown), which is also stored in the memory of the user equipment, if the femtocell is connected to the network in which the serving base station 102 operates via such a gateway. Given such gateway identification information, the base station 102 can send any message for the femtocell 108 to its gateway first, and then the gateway can forward the message to the femtocell 108 according to its identification information contained in the message. Such gateway identification information shall be broadcasted by the femtocell 108 so that the user equipment 104 can acquire this information when it is in the range of the femtocell 108. Alternatively, the user equipment 104 can store this information in the memory in addition to the femtocell identification information.

In addition, the message can include a subscriber ID for the user equipment which is used for access control in the femtocell. The subscriber ID may be used by the femtocell to make sure that the user equipment has authorized access to the femtocell. Moreover, assuming the network stores the neighboring relationship between macro cells and femtocells and the femtocell subscription information for each user equipment, the subscriber ID or user equipment ID which is contained in a tracking area update message by default and can be used by the core network element or the serving macro base station to determine if the user equipment is near the femtocell to which it is registered. The serving base station 102 receives the tracking area update message from the user equipment 104 that identifies the femtocell 108. The serving base station 102 (or some core network element) identifies 206 the femtocell according to the tracking area identification or the global cell identification of femtocell that is a part of the tracking area update message.

Once the femtocell 108 has been identified to the serving base station 102, the serving base station 102, or some core network element, sends 208 a message to the femtocell 108 to activate the femtocell for the user equipment. Thus, only the femtocells that have registered user equipment operating within a macro cell are active sending and receiving messages and capable of receiving the user equipment as a part of a handover. In an embodiment, the message sent from the base station to the femtocell can turn on the femtocell so that it can start to transmit and receive messages with the user equipment. In another embodiment, the serving base station 108 sends messages to the femtocell to increase the control channel transmission power so that the control channel power is high enough to ensure that the user equipment can be handed over from the macro cell to the femtocell. If the control channel transmission power is high enough, the message can initiate the handover process from the macro cell to the femtocell.

In an embodiment, the core network element may not send any message to the femtocell when the user equipment is far away from its femtocell. The benefits that the network stores the macro-femto neighboring relationship and the femtocell subscription information are as follows: First, the user equipment does not need to store identification information of the macro cell that overlays the femtocell to which it is registered thus no updates is needed even if this identification information has changed; Secondly, the first message does not need to include the femtocell identification information thus the tracking area update (or location/routing area update) message may be reused without any modification.

In response to receiving the message from the serving base station 102 (or some core network element), the femtocell 108 and the serving base station 102 will select 210 the physical cell identifier and other crucial information that will facilitate femtocell scanning including femtocell carrier frequency, DCD/UCD information (for WiMax), information on when to scan for the femtocell, information on which resources block is to be scanned for the femtocell, information on when to send uplink requests, information on which resource block or ranging code should be used as a part of scanning, handover or cell reselection. Once this information is determined, a tracking area update response message is sent 212 to the user equipment that includes all these information. With receipt of the tracking area update response, the user equipment receives information regarding the femtocell 108, and the user equipment 104 can scan for femtocell 108 and be handed over from the serving base station 102 to the femtocell 108 according to standard procedures.

The macro cell global cell identifiers, tracking area identifiers and other information stored in the user equipment 104, such as home cell gateway identification information or home cell MAC and/or PHY identifiers, can change over time. When this happens, the user equipment 104 is updated so that when it is in or near the femtocell the described method can operate properly and the user equipment can be handed over to the femtocell appropriately. The user equipment 104 may get the updated information from a femtocell management system. The user equipment may periodically ask the femtocell management system for essential information updates. For example, the updates can be sought whenever the user equipment performs periodic location updates. Alternatively, the femtocell management system can send a message to the user equipment to update its stored information whenever a change has occurred.

FIG. 3 is a call flow diagram 300 describing the operation when the user equipment 104 leaves a femtocell in which it is operating. This process is similar to the process described above for when the user equipment enters the femtocell. To begin, the user equipment determines 302 that it is leaving the tracking area of the femtocell to which it is operating. In an embodiment, this can be when the user equipment exits the macro cell In response to detecting that the user equipment 104 needs to handed out from the femtocell or macro cell, the user equipment sends 304 a tracking area update message to the serving base station 104 of the macro cell 106 in which the femtocell 108 and the user equipment 104 are located. The tracking area update message includes the femtocell global cell identifier, the femtocell tracking area identifier or the macro cell global cell identifier. In addition, the tracking area update message includes an off indication bit so that the femtocell can be turned off or the control channel transmission power can be reduced.

When the serving base station 102 or some core network element receives the tracking area update message from the user equipment, it identifies 306 femtocell by the global cell identifier or the tracking area identifier. The serving base station 102 sends 308 a message to the femtocell 108 so that the femtocell can be turned off or the control channel transmission power is reduced. A tracking area update response is sent 310 from the serving base station 102 to the user equipment 104. Thus, only the femtocells that have registered user equipment operating in the macro cell are active.

As can be understood, the methods described above provide numerous benefits. Because a macro cell 106 can have a plurality of femtocells 108 operating within it, user equipment can experience high interference from the numerous messages being sent between user equipment 104 and femtocells 108 in attempts to hand over the user equipment to the femtocell. As the user equipment is only permitted to operate a small number of the plurality of femtocells, the likelihood of being handed over to a femtocell is low. Similarly, the high density of femtocell deployment causes user equipment to attempt to access a large number of femtocells in a short period of time.

According to the described methods, femtocells are not sending excessive messages because they are turned off when the user equipment leaves the femtocell. This reduces the number of messages being sent. The femtocell is turned on only when the user equipment is in proximity or within range of the femtocell.

In addition, the described method provides benefits over the user equipment using macro cell fingerprints to search for its femtocell. The described methods propose using a tracking area update message to notify the network of the user equipments location. Therefore, the described methods give control of the user equipment mobility and make it possible to turn on and off the femtocell to reduce its interference with other femtocells and for the user equipment. As is understood from the description, the method provides a distributed solution that relies on the serving base station 102, the user equipment 104 and the femtocell 106.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
    determining, by a user equipment, that the user equipment is leaving a home cell wherein the home cell is one of a plurality of cells that are within an area served by a serving base station, and wherein the home cell is a femtocell when the home cell is in a macro cell served by the serving base station in which the femtocell is located;
    sending, by the user equipment, a first message to the serving base station near which the home cell is located in response to determining that the user equipment is leaving the home cell, the first message including identification information for the home cell, wherein the first message causes the serving base station to send a second message to the home cell to turn off or reduce control channel transmission power of the home cell; and
    receiving, by the user equipment, a third message from the serving base station.

2. The method of claim 1, wherein the step of determining that the user equipment is leaving the home cell includes detecting that the user equipment needs to be handed out from the home cell.

3. The method of claim 1, further comprising storing at least one of an identifier of the home cell and an identifier corresponding to the serving base station.

4. The method of claim 1, wherein the first message is a tracking area update message.

5. The method of claim 4, wherein the tracking area update message includes at least one of an identifier of the home cell and an identifier of the user equipment.

6. The method of claim 4, wherein the tracking area update message includes an identifier of a tracking area of the home cell.

7. The method of claim 4, wherein the tracking area update message includes an identifier of the macro cell.

8. The method of claim 1, wherein the first message includes an off bit indicating that the home cell can be turned off or that control channel transmission power can be reduced.

9. The method of claim 1, further comprising requesting, by the user equipment, a home cell management system for updates of its information related to the home cell to which it is registered.

10. The method of claim 9, further comprising receiving a message to update information by the user equipment related to the home cell to which it is registered whenever a change has occurred.

11. The method of claim 1, wherein the second message includes at least one of an identifier of the home cell and an identifier corresponding to the serving base station.

12. The method of claim 1, wherein the third message includes at least one of a physical identifier of the home cell, carrier frequency of the home cell, timing information to scan for the home cell, information on which resources block to scan for, information on when to send a request, information on which resource block or ranging code to use in on of scanning, handover, and cell reselection.

13. A serving base station serving an area including a plurality of cells, the plurality of cells including a home cell, the home cell being a femtocell when the home cell is in a macro cell served by the serving base station in which the femtocell is located, the serving base station comprising:
    memory storing instructions; and
    one or more processors configured to execute the instructions to:
        receive a first message from a user equipment leaving the home cell, the first message including identification information for the home cell;
        send, in response to receiving the first message, a second message to the home cell to turn off or reduce control channel transmission power of the home cell; and
        send to the user equipment a third message, the third message being a tracking area update message.

14. The serving base station of claim 13, wherein the first message is a tracking area update message.

15. The serving base station of claim 14, wherein the first message includes at least one of an identifier of the home cell, an identifier of a tracking area of the home cell, an identifier of the macro cell, and an identifier of the user equipment.

16. The serving base station of claim 13, wherein the first message includes an off bit indicating that the home cell can be turned off or that control channel transmission power can be reduced.

17. The serving base station of claim 13, wherein the second message includes at least one of an identifier of the home cell and an identifier corresponding to the serving base station.

18. The serving base station of claim 13, wherein the third message includes at least one of a physical identifier of the home cell, carrier frequency of the home cell, timing information to scan for the home cell, information on which resources block to scan for, information on when to send a request, information on which resource block or ranging code to use in on of scanning, handover, and cell reselection.

19. A user equipment comprising:
   memory storing instructions;
   one or more processors configured to execute the instructions to:
   determine that the user equipment is leaving a home cell wherein the home cell is one of a plurality of cells that are within an area served by a serving base station, and wherein the home cell is a femtocell when the home cell is in a macro cell served by the serving base station in which the femtocell is located;
   send a first message to the serving base station near which the home cell is located in response to determining that the user equipment is leaving the home cell, the first message including identification information for the home cell, wherein the first message causes the serving base station to send a second message to the home cell to turn off or reduce control channel transmission power of the home cell; and
   receive a third message from the serving base station.

* * * * *